United States Patent
Mosquet et al.

(10) Patent No.: US 8,258,228 B2
(45) Date of Patent: *Sep. 4, 2012

(54) TREATMENT COMPOSITIONS FOR FRESH CONCRETE OR MORTAR SURFACES WHICH OFFER IMPROVED ADHESION CAPACITY AND WATER RETENTION POWER

(76) Inventors: Martin Mosquet, Sermaises (FR); Olivier Malbault, Boutigny sur Essonne (FR); Isabelle Dubois-Brugger, Avon (FR)

(*) Notice: Subject to any disclaimer, the term of this patent is extended or adjusted under 35 U.S.C. 154(b) by 247 days.

This patent is subject to a terminal disclaimer.

(21) Appl. No.: 12/611,646

(22) Filed: Nov. 3, 2009

(65) Prior Publication Data

US 2010/0210776 A1 Aug. 19, 2010

Related U.S. Application Data

(63) Continuation of application No. 10/516,446, and a continuation of application No. PCT/FR03/01614, filed on May 28, 2003, now Pat. No. 7,612,157.

(30) Foreign Application Priority Data

May 30, 2002 (FR) ..................... 02 06653

(51) Int. Cl.
- *C08L 91/06* (2006.01)
- *C04B 40/04* (2006.01)
- *C04B 41/47* (2006.01)
- *C04B 41/48* (2006.01)

(52) U.S. Cl. ........ 524/490; 524/487; 524/560; 524/306; 524/315; 524/321; 524/322; 106/285; 106/272; 106/270; 106/822

(58) Field of Classification Search ............ 524/490, 524/560, 487; 106/285

See application file for complete search history.

(56) References Cited

U.S. PATENT DOCUMENTS

| | | | | |
|---|---|---|---|---|
| 4,525,495 A * | 6/1985 | Dorman et al. | ............... | 523/205 |
| 4,563,296 A * | 1/1986 | Gomez | ............... | 252/1 |
| 4,681,910 A * | 7/1987 | Crockatt et al. | ............... | 524/487 |
| 4,830,783 A * | 5/1989 | Ellis et al. | ............... | 510/113 |
| 5,488,021 A * | 1/1996 | DeLiso et al. | ............... | 502/63 |
| 6,358,438 B1 * | 3/2002 | Isozaki et al. | ............... | 252/511 |

FOREIGN PATENT DOCUMENTS

DE 197 35 431 C1 * 2/1999

* cited by examiner

*Primary Examiner* — Rip A. Lee
(74) *Attorney, Agent, or Firm* — McCarter & English, LLP

(57) ABSTRACT

The invention relates to compositions intended to be applied to the surfaces of freshly poured mortars and/or concretes, before the beginning of the setting, in order simultaneously to prevent the evaporation of the water present in said mortars and/or concretes, which is necessary for their setting and then for their hardening, and in order to create, on said treated surfaces, high adhesiveness for the finishing materials intended to cover them, these compositions being provided in the form of aqueous emulsions comprising at least one paraffin wax (a), alone or in combination with at least one hydrocarbon compound (b) and/or with at least one other hydrocarbon compound (c) different from the hydrocarbon compound (b), and also comprising at least one latex (d) formed of a colloidal aqueous emulsion of at least one polymer, and at least one pulverulent inorganic or organic filler (e).

19 Claims, No Drawings

TREATMENT COMPOSITIONS FOR FRESH CONCRETE OR MORTAR SURFACES WHICH OFFER IMPROVED ADHESION CAPACITY AND WATER RETENTION POWER

The present application is a continuation application and claims priority to U.S. application Ser. No. 10/516,446 filed Oct. 12, 2005, now U.S. Pat. No. 7,612,157, and to international application no. PCT/FR03/01614 filed May 28, 2003.

FIELD OF THE INVENTION

The invention relates to aqueous compositions for the treatment of the surfaces of freshly placed or freshly demolded mortars and/or concretes which provide the water retention necessary for their setting and their hardening and which bestow, on said treated surfaces, high adhesiveness for the finishing materials intended to cover them.

The invention relates more particularly to curing compositions for the surfaces of freshly placed or freshly demolded mortars and/or concretes in order to prevent the evaporation of a portion of the water involved in their preparation, this water being necessary for their setting and their hardening, and in order to give the surfaces thus treated high adhesiveness for the finishing materials intended to cover them, which compositions comprise, in an aqueous emulsion, at least one paraffin wax, alone or in combination with another hydrocarbon compound in the solid and/or liquid state at ambient temperature, such as, for example, natural or synthetic hydrocarbon waxes and/or oils, at least one latex and at least one pulverulent filler of inorganic and/or organic origin, these various compounds acting in complete synergy.

The invention also relates to the process for the preparation of said compositions and for the application of said compositions at the surface of freshly placed or freshly demolded mortars and/or concretes.

Finally, the invention relates to the use of said compositions in the form of a layer, deposited on the surface of freshly placed or freshly demolded mortars and/or concretes, applied in order to provide water retention within mortars and/or concretes during their setting and their hardening, and to maintain therein an amount of water sufficient for the purposes of preventing, or at least limiting, phenomena of shrinkage with the appearance of cracks, and to retain, in these mortars and/or concretes, the desired characteristics, such as, for example, a very low shrinkage, good water impermeability, excellent frost resistance and others, and thus to provide said mortar and/or concrete surfaces with high adhesiveness for the finishing materials intended to cover them, such as plaster, ceramics, paints, various coatings or others, without prior removal of said layer.

STATE OF THE ART

The incorporation of water into a medium comprising a hydraulic binder among its constituents, such as mortars and/or concretes, brings about irreversible reactions in which needle-shaped crystals are formed by hydration of the inorganic salts present, which are initially amorphous and anhydrous, and results in the setting of the hydraulic binder by the interpenetration of these needle-shaped crystals, thickening and strengthening and then hardening the medium comprising them.

As the use of hydraulic binder or of media comprising it takes place in the open air and as, in addition, the setting reaction is exothermic, it is known that a fraction of the water incorporated in the binder or in the medium comprising it evaporates and that there is consequently a lack of water for ensuring the continuation of the crystallization during the hardening stage, during which the hydraulic binder or the medium comprising it acquires all the desired mechanical characteristics, such as, for example, a low degree of shrinkage, impermeability to water, resistance to low temperatures and high mechanical strength.

For a long time, one of the commonest failings has been the appearance of cracks related to the shrinkage of the mortar or concrete comprising a hydraulic binder during hardening, this shrinkage very frequently being the consequence of a loss of water by evaporation when the medium comprising the hydraulic binder, in particular mortars and concretes, is subjected to the simultaneous action of the exothermicity developed by the setting, of its exposure to the sun and of the existence of natural drying ventilation.

Various means have been used to compensate for or prevent loss by evaporation of a portion of the water incorporated in media comprising, among their constituents, a hydraulic binder, such as, in particular, mortars and concretes.

According to a first type of means, a conventional and long-standing treatment for preventing the evaporation of water consists in keeping the surface of freshly placed or freshly demolded mortars and/or concretes in contact with surroundings which are as permanently as possible humid during the setting time by the creation of a sustained film of water or by the use of a textile substrate with a spongy nature which is impregnated with water or by the use of a polymer film unwound over said surface to prevent evaporation, creating a greenhouse environment between the surface to be protected and the atmosphere.

However, this first type of means is not much used today on building sites or sites involving substantial renovation as it requires close monitoring and, consequently, takes up manpower, rendering it particularly expensive.

According to another type of means, an adherent and protective continuous film is created on the surface of the mortars and/or concretes by depositing thereon, by spraying or by brushing, a paraffin wax, alone or in combination with at least one hydrocarbon resin, in solution in an organic solvent, to form a barrier between said surface and the surrounding atmosphere and thus to prevent the occurrence of the phenomenon of evaporation of the water present in the composition of the mortars and/or concretes.

However, there are several disadvantages to this type of means which can render its use unacceptable. Mention may be made, among the most significant disadvantages, for example, of:

the use of organic solvents, which constitutes a danger to the environment, in particular when solvents with a carcinogenic nature, such as benzene, toluene and other aromatic solvents, or halogenated solvents, such as chlorinated hydrocarbons (trichloroethylene or perchloroethylene), are used, the incompatibility of organic solvents with water, which makes it necessary to wait, in order to create the protective film on the surface to be protected, for the moisture content of this surface to be as low as possible, said film being created once the setting of the mortars and/or concretes is already well initiated. Consequently, the film is created too late and often ineffectively since the evaporation of the water, which has to be prevented, is also underway, indeed even well advanced.

Finally, according to another type of means, a continuous and protective film is created on the surface of the freshly placed or freshly demolded mortars and/or concretes by depositing thereon, by spraying or by brushing, an emulsion in water of a paraffin wax, alone or in combination with at least one other compound, such as a hydrocarbon resin, a hydrocarbon oil and/or a pigmentary filler and/or fatty alcohols and/or fatty acids, in order to form, at an early stage at the beginning of the setting, a barrier between said surface and the surrounding atmosphere and to thus prevent the occurrence of the phenomenon of evaporation of the water involved in the composition of the mortars and/or concretes. In common with the mortars and concretes, this emulsion comprises water, which renders this type of evaporation control treatment compatible and particularly advantageous.

However, the last two types of means used to treat the surfaces of freshly placed or freshly demolded mortars and/or concretes, in order to provide the water retention necessary for their setting and for their hardening, result in new disadvantages which constitute major failings when the surfaces thus treated are to be covered by finishing materials, such as, for example, plaster finishes, paints, renderings, ceramics or others.

Specifically, it is apparent that:
the poorly controlled, incomplete and uneven decomposition of the film created to form a barrier to evaporation, which decomposition is brought about by the action of ultraviolet radiation, leaves large amounts of residues of said protective film adhering to the treated surface;
residues of the decomposed film adhering to the treated surface reduce the adhesiveness at said surface of the finishing materials, such as plaster finishes, paints, adhesives for ceramics and others, when the finishing work begins.
in order to obtain satisfactory adhesion of the finishing materials at said surface thus treated, it turns out to be absolutely necessary to brush, scrape or sand down said surface before beginning the finishing work, in order to remove therefrom the protective film residues still adhering.

Coming under the final type of means, numerous documents disclose compositions as an emulsion in water intended for the treatment of the surfaces of freshly placed or freshly demolded mortars and/or concretes, the function of which is to prevent the evaporation of the water involved in the formation of said mortars and concretes.

U.S. Pat. No. 2,928,752 discloses aqueous emulsions intended for the protection of the surfaces of mortars and/or concretes during the setting period and then at the beginning of the hardening period, in order to prevent water evaporation, these emulsions comprising a paraffin wax, a reaction product prepared from ethylene oxide and unsaturated oleyl alcohol, an amine salt of a long-chain $C_{12}$ to $C_{18}$ carboxylic acid, a long-chain $C_{12}$ to $C_{20}$ fatty alcohol and, optionally, a small amount (0 to 10% by weight) of a mineral oil intimately mixed, when it is present, with the molten paraffin wax, in order to render this paraffin wax more maleable.

These compositions, the essential disadvantage of which is that of being rendered complex by the number of components of which they are formed, are supposed to be rendered more adhesive to the surfaces of mortars and/or concretes to be protected from the evaporation of the water by virtue of the presence of the amine functional group, which has an affinity for the components of the mortars and/or concretes.

However, these coating compositions for protecting the surfaces of the mortars and/or concretes in order to prevent the evaporation of the water have disadvantages which, in addition to the complexity of their formulations, are, for example:

the presence of alcohol or acid functional groups in said compositions, which presence can result in the occurrence of a setting delay at the surface of the treated mortar and/or concrete and/or can optionally result in a more or less pronounced deactivation of the mortar and/or concrete, depending on the amounts of alcohol or acid functional groups present;
a water retention which is often inadequate in surface-treated mortars and/or concretes, resulting in phenomena of cracking;
lack of adhesion of the finishing materials applied to the surfaces treated by means of said compositions.

U.S. Pat. No. 3,189,469 discloses aqueous emulsions with a reflective capacity when they are applied to the surfaces of freshly placed or freshly demolded mortars and/or concretes intended to be protected from the evaporation of the water during the setting period and the beginning of the hardening, which are composed, in combination, of a hydrocarbon wax, which is essentially paraffin wax, in a proportion of 15 to 50% by weight, of a product of the reaction between saturated and unsaturated $C_{12}$ to $C_{22}$ fatty acids and an alkaline agent, such as an alkaline hydroxide or an amine, in a proportion of 1 to 10% by weight of said product, of an inorganic pigment with a high reflecting power, such as $TiO_2$, $CaCO_3$, $ZnO$ or $MgCO_3$, in a proportion of 1 to 10% by weight, and of a nonionic and anionic dispersing agent, in a proportion of 1 to 3% by weight.

These compositions are supposed to be rendered more adherent to the surfaces of mortars and/or concretes to be protected from the evaporation of the water by virtue of the presence of the amine functional group or of the alkaline compound, which neutralize the acid functional group of the saturated and unsaturated fatty acids, this amine functional group and this alkaline compound having the advantage of having an affinity with regard to the components of the mortars and/or concretes.

Despite this advantage, there are disadvantages to these coating compositions for protecting the surfaces of mortars and/or concretes in order to prevent the evaporation of the water during their setting and their hardening, which are, for example:

the complexity of their formulation;
the presence of acid functional groups introduced by the fatty acids which can result in the appearance of a setting delay at the surface of the treated mortars and/or concretes and/or which may possibly result in more or less pronounced deactivation of the mortar and/or concrete, depending on the amounts of acid functional groups present;
the presence of a pigment, such as $TiO_2$, for providing said compositions with a high reflectivity, which can help in reducing the evaporation of the water at the surface of the mortars and/or concretes during the setting and the hardening;
a water retention to be regarded as inadequate;
lack of adhesion of the finishing materials applied to the treated surfaces, a consequence of the presence in said compositions of acid functional groups.

U.S. Pat. No. 4,239,540 discloses an aqueous emulsion for the protection of the surfaces of freshly placed or freshly demolded mortars and/or concretes, in order to prevent the evaporation of water during the setting period and then the hardening period, which is composed of a paraffin wax (18.2% by weight), of a mixture of oils formed of a coconut oil (4.2% by weight), of a soybean oil (3.3% by weight), of a linseed oil (4.2% by weight), of stearic acids (3.4% by weight), of hexacosanoic acid (1.6% by weight), of water (62.5% by weight) and of an ethyl cyanuric ester (2.6% by weight) as emulsifying agent.

This aqueous emulsion with a very specific composition, which might seem advantageous for the treatment, for preventing the evaporation of the water, of the surfaces of mortars and/or concretes during the setting and the hardening, does not appear to be able to be made use of because the results stated show that it has a very low capability of being a water retainer (0.027 to 0.038 g of water/cm$^2$). In addition, this aqueous emulsion comprises organic acids, the acid functional groups of which can result in:

a more or less pronounced deactivation of the mortar and/or concrete on which said emulsion is deposited, bringing about a loss in adhesion for the finishing materials applied to the treated surfaces;

the appearance of a setting delay at the surface of said treated mortars and/or concretes;

lack of adhesion of the finishing materials applied to the treated surfaces.

U.S. Pat. No. 4,495,319 discloses a method for the preparation of an emulsion intended for the curing treatment of the surfaces of freshly placed or freshly demolded mortars and/or concretes in order to prevent the evaporation of the water present at the surface of said mortars and/or concretes during the setting period and the hardening period. This emulsion is formed from hydrocarbon resin, from paraffin wax and from emulsifying agents obtained from fatty acids and morpholine. The presence of pigments, such as $TiO_2$, and/or of an inorganic filler, such as $CaCO_3$, used as pigment, is also disclosed.

However, this emulsion exhibits the disadvantage of being composed of materials which are solid at ambient temperature, that is to say of paraffin wax and of hydrocarbon resin in the solid state, making it difficult to prepare the emulsion and resulting in an emulsion which may be unstable and in a fairly disappointing use as protective film against evaporation of the water from the surface of freshly placed or freshly demolded mortars and/or concretes: the ability of this emulsion to prevent loss of water by evaporation appears to be inadequate, even if this emulsion were to comprise a pigment for increasing the reflectance thereof and, consequently, for attempting to increase its effectiveness. Furthermore, another disadvantage is revealed in the appearance of a lack of adhesion of the finishing materials applied to the treated surfaces.

Patent Application FR 2 691 962 A discloses aqueous emulsions formed of paraffin wax and of natural or synthetic hydrocarbon resins, in particular pine resins, which are intended to be applied to the surfaces of freshly placed or freshly demolded mortars and/or concretes in order to limit the evaporation of the water during the setting period and the beginning of the hardening. These emulsions are composed of materials which are solid at ambient temperature. However, the use of these emulsions as protective film against the evaporation of the water from the surface of freshly placed or freshly demolded mortars and/or concretes does not appear to be satisfactory with regard to the results stated (52.8% after two hours, much less than the 85% of the paraffin wax alone) and is the cause of the lack of adhesion for the finishing materials applied subsequently to the treated surfaces.

Another document, DE 197 35 431 C, discloses an aqueous treatment product for wet concrete, characterized by a mixture composed of 10.0 to 30.0% by weight of aqueous butyl acrylate copolymer dispersion devoid of plasticizer or of aqueous methacrylate copolymer dispersion (a), of 1.0 to 10.0% by weight of solution of sodium and potassium silicates, of 0.1 to 2.0% by weight of antifoaming agent, of 0.2 to 4.0% by weight of thixotropic agent, of 0.1 to 10.0% by weight of micronized polyethylene wax and of 88.6 to 44.0% by weight of water, for producing a covering which is impermeable to water and to water vapor on the surface of fresh concrete and on the surface of green concrete of concrete building components.

This aqueous treatment product for wet concrete forms a water-impermeable covering which adheres to the surfaces of fresh concretes to be protected from the evaporation of the water and protects them from drying and from the damage inflicted by torrential rain.

However, this aqueous treatment product, which forms a covering which protects the surfaces of fresh concretes in order to prevent the evaporation of water during their setting and their hardening, does not exhibit any difficulty with regard to removal or cleaning once the covered concrete has completely hardened, so as to re-expose the raw concrete surface.

This ease of removal of the protective covering, once the concrete has hardened, indicates a low mechanical strength of said covering during adhesion of the finishing materials to the treated surfaces.

Consequently, it appears necessary to remove or to eliminate this protective covering, created to form a barrier to evaporation, before beginning the finishing work on the raw concrete surface in order to obtain significant adhesion between finishing materials intended to cover it and the hardened concrete.

Subject Matters of the Invention

As revealed by the state of the art, the aqueous emulsions provided and intended to be applied to the surfaces of freshly placed or freshly demolded mortars and/or concretes in order to limit the evaporation of the water from the beginning of setting exhibit numerous disadvantages.

This is why the subject matters assigned to the invention are many and multifarious, as are the abovementioned disadvantages, in order to introduce at least one improvement thereto.

The various subject matters assigned to the invention are the creation of organic compositions which are aqueous emulsions possessing essential characteristics which are necessary and desired in order for them to be applied to the surfaces of freshly placed or freshly demolded mortars and/or concretes and, once applied, for them to limit and preferably prevent the evaporation of the water, which is absolutely necessary for their setting and for their hardening.

Some of the essential characteristics assigned to the aqueous emulsions according to the invention are specified by way of illustration. Thus, the aqueous emulsions according to the invention:

must be formed of the paraffin wax usually present and of other hydrocarbon compounds which can be emulsified in an aqueous medium;

must not comprise compounds capable of deactivating the surfaces of the mortars and/or concretes receiving them, which would weaken their adhesiveness for the finishing materials which subsequently cover these surfaces;

must be devoid of compounds capable of retarding, at the surface, the setting of the mortars and/or concretes which are covered with them;

must be easy to prepare and stable after their preparation;

must be easy to apply to the surfaces to be treated, preferably by spraying;

must be applied very rapidly to the surfaces of freshly placed or freshly demolded mortars and/or concretes in order to actually ensure retention of the composition water;

must be able to provide said treated surfaces with greater protection against the evaporation of the water than that of the paraffin wax alone, by formation of a film which is a barrier to said evaporation;

must not comprise compounds which are particularly harmful to the environment;

must be devoid of carcinogenic compounds, such as, in particular, benzene, toluene and xylene;

must also form, at the surface of freshly placed or freshly demolded mortars and/or concretes, not only a film which is a barrier to the evaporation but also a film which adheres strongly to the treated surface after said mortars and/or concretes have set and hardened;

must make possible, whether or not there is even partial decomposition of the barrier film, much improved adhesion for the finishing materials applied to the surfaces covered with the film, without it being necessary to remove it from said surfaces before these surfaces are covered with the finishing materials.

SUMMARY OF THE INVENTION

According to the invention, the aqueous emulsions intended to be applied to the surfaces of freshly placed of freshly demolded mortars and/or concretes in order to prevent the evaporation of the water from the beginning of setting and to create, on said surfaces, high adhesiveness for the finishing materials to be deposited thereon at least partially remove the disadvantages displayed in the state of the art and, in addition, introduce substantial improvements not existing in the means described to date, in order to render the emulsions particularly effective in the role which is assigned to them.

According to the invention, the compositions intended to be applied to the surfaces of freshly placed or freshly demolded mortars and/or concretes in order both to prevent the evaporation of the water present in said mortars and concretes, which is necessary for their setting and then for their hardening, and to create, on said treated surfaces, high adhesiveness for the finishing materials intended to cover them are provided in the form of aqueous emulsions comprising at least one paraffin wax (a), alone or in combination with at least one other hydrocarbon compound (b) and/or hydrocarbon compound (c), such as a hydrocarbon wax or oil which is solid or liquid at ambient temperature, and also comprising at least one latex formed of a colloidal aqueous emulsion of at least one polymer and at least one pulverulent filler of inorganic and/or organic origin.

The term "hydrocarbon compound" should be understood as meaning any organic compound essentially composed of carbon and hydrogen and which can also comprise at least one of the elements from oxygen, nitrogen, sulfur and phosphorus.

Also according to the invention, the compositions intended to be applied to the surfaces of freshly placed or freshly demolded mortars and/or concretes in order both to prevent the evaporation of the water present in said mortars and/or concretes, which is necessary for their setting and then for their hardening, and to create, on said treated surfaces, high adhesiveness for the finishing materials intended to cover them are provided in the form of aqueous emulsions comprising, according to a novel combination of means, at least one paraffin wax (a), alone or in combination with at least one hydrocarbon compound (b) and/or at least one other hydrocarbon compound (c) different from the hydrocarbon compound (b), at least one latex (d) formed of a colloidal aqueous emulsion of at least one polymer, and at least one pulverulent filler of inorganic and/or organic origin (e).

More particularly, and according to the invention, the compositions intended to be applied to the surfaces of freshly placed or freshly demolded mortars and/or concretes, before the beginning of setting, for the purpose of rendering them both synergistic, in order to prevent the evaporation of the water necessary for their setting and for their hardening and to create, on said surfaces, high adhesiveness of the finishing materials, are provided in the form of an aqueous emulsion comprising at least one paraffin wax, alone or in combination with at least one other hydrocarbon compound, and are characterized in that they are composed:

a) of at least one paraffin wax of petroleum or synthetic origin including, as a mixture, saturated and unsaturated aliphatic hydrocarbons of general formulae $C_nH_{2n+2}$ and $C_nH_{2n}$ for which n is at least equal to 30 and for which the melting point is between 40° C. and 75° C.;

b) and/or of at least one linear and/or cyclic hydrocarbon oil of aliphatic and/or naphthenic origin which are hydrocarbon chains, alone or as a mixture, of general formulae $C_nH_{2n+2}$ and $C_nH_{2n}$ for which n is less than 30, in the liquid state at ambient temperature;

c) and/or of at least one hydrocarbon compound different from (b) which can be an oil formed of at least one ester resulting from the condensation reaction of a saturated and/or unsaturated fatty acid with an alcohol having from one to five hydric functional groups;

d) of at least one latex formed of a colloidal aqueous emulsion of at least one polymer;

e) of at least one pulverulent filler of inorganic and/or organic origin.

DETAILED DESCRIPTION OF THE INVENTION

The compositions according to the invention, intended to be applied to the surfaces of freshly placed or freshly demolded mortars and/or concretes before the beginning of setting in order to prevent the evaporation of the water necessary for their setting, are:

aqueous emulsions of paraffin wax, of hydrocarbon compounds, in particular oils, of latexes and of inorganic fillers;

synergistic with regard to the water retention and with regard to the increase in the adhesiveness through their components and the relative amounts of these various components involved;

stable on storage, even long-term storage.

According to the invention, the compositions intended both, by their presence on the surfaces of freshly placed or freshly demolded mortars and/or concretes, to prevent the evaporation of the water and to bestow, on said treated surfaces, improved adhesiveness for the finishing materials intended to cover them are aqueous emulsions based on paraffin wax. In point of fact, an emulsion is, by definition, a dispersion of a liquid compound, or compound rendered liquid, in another liquid compound. In the case of the invention, the paraffin compound, referred to as component (a), which, at ambient temperature, is a water-immiscible solid compound, is rendered liquid by a slight rise in temperature and is simultaneously dispersed in water brought to an appropriate temperature for the formation of an emulsion with vigorous stirring. However, the paraffin compound may already exist in the form of a commercial aqueous emulsion and can be used in this state for the preparation of the compositions according to the invention.

The paraffin wax can be employed in the context of the invention alone or in combination with at least one other hydrocarbon compound for the preparation of the abovementioned emulsion.

Said paraffin wax is chosen from the group consisting of alkanes and/or alkenes, taken alone or as a mixture, which are saturated and/or unsaturated hydrocarbons of petroleum or synthetic origin of general formulae $C_nH_{2n+2}$ and $C_nH_{2n}$ for which n is at least equal to 30 and preferably between $30 \leq n \leq 120$ and for which the melting point is between 40° C. and 75° C. and preferably between 50° C. and 70° C.

From the value of "n" and the relative amounts of alkanes and alkenes forming the paraffin wax employed, the density of said paraffin wax is between 0.85 and 0.95 and preferably between 0.88 and 0.92.

To prevent the emulsion produced by the dispersion of the molten paraffin wax in water from giving a coalescence effect, that is to say the paraffin wax and the water from separating into two layers, an emulsifying agent which facilitates the stability of the emulsion can be introduced into said emulsion, this agent being active in a capillary sense and being positioned, owing to an adsorption phenomenon, at the surface which separates the microdroplets of paraffin wax and water, these being surrounded by an interfacial film.

Such an emulsifying agent can be anionic and/or nonionic in nature. It can be chosen from well-known emulsifying products, such as $C_8$ to $C_{22}$ fatty acids neutralized by an amine, in particular triethanolamine; sulfonated or phosphonated compounds; fatty alcohols; sorbitan esters; ethylene oxide/propylene oxide copolymers; or others. Such emulsifying agents are, for example, sold by Seppic under the name of Simulsol, Montane or Montanox and by Lambert-Riviére under the name of Syntopon.

Emulsions formed of paraffin wax in water, the paraffin wax of which corresponds to the above-mentioned characteristics, are sold, for example, by Exxon-Mobil Oil under the trade names Mobilcer 115, Mobilcer 730, Mobilcer C, Prowax 397 and Mobilwax 2370 or by Suddeutsche Emulsions Chemie under the trade names Wukonil KN 50, Wukonil LP 50 and Wukonil LP 38 or by Michelman under the trade name ME91240E.

The compositions according to the invention can also comprise, in addition to the paraffin wax, at least one other hydrocarbon compound in the solid or liquid state at ambient temperature which can be chosen from the group consisting of natural or synthetic hydrocarbon waxes and/or oils, such as the oils pine oil or rosin oil, "vegetable" oils, such as rapeseed oil, sunflower oil or palm oil, or "mineral" oils, such as paraffinic or naphthenic oils.

Preferably, the compositions according to the invention can comprise, as another hydrocarbon compound, at least one hydrocarbon oil, referred to as component (b), of petroleum origin of aliphatic and/or naphthenic type and, in the latter case, resulting from the series of the cyclopentanes and cyclohexanes, which are saturated and/or unsaturated hydrocarbons, present alone or as mixtures, of general formulae $C_nH_{2n+2}$ and/or $C_nH_{2n}$ for which n is less than 30 and is preferably between 10 and 25, these hydrocarbon oils being in a liquid state at ambient temperature.

All these oils have, under standard temperature and pressure conditions, a kinematic viscosity of between 5 and 500 $mm^2/s$ and a density of between 0.83 and 0.97.

Mention may be made, as hydrocarbon oil of aliphatic and/or naphthenic origin, by way of example, of the oil of Neutral type, sold by Exxon-Mobil, which has a kinematic viscosity of 20 $mm^2/s$, or the oils HMVIP 30 and HVI 65, sold by Shell, and 60 Neutral, 80 Neutral and 150 Neutral, sold by Exxon-Mobil.

The compositions according to the invention can also comprise, in combination with or as replacement for the hydrocarbon compound (b), at least one other hydrocarbon compound different from (b) which can be an oil which is liquid at ambient temperature, which can be formed of an ester resulting from the condensation reaction of a saturated and/or unsaturated fatty acid with a mono-, di- or trihydric alcohol, constituting the component (c).

The fatty acids participating in the formation of the ester according to the invention are saturated and/or unsaturated and branched or unbranched hydrocarbon compounds, for example originating from the hydrolysis of oils and of fatty substances, preferably carrying a single carboxylic acid functional group. They are generally chosen, for example, from the group consisting of $C_8$ to $C_{24}$ fatty acids, such as, for example, caprylic, capric, lauric, myristic, palmitic, stearic, arachidic, behenic, lignoceric, palmitoleic, oleic, gadoleic, erucic, linoleic, linolenic and isolinolenic acids.

The alcohols participating in the formation of the ester according to the invention are $C_2$ to $C_{20}$ hydrocarbon compounds comprising from one to five alcohol functional groups. These alcohols can be chosen from the group consisting of alkanols and/or alkenols, such as, for example, ethanol, propanol, butanol, pentanol, stearyl alcohol or oleyl alcohol, when it is a matter of using a monohydric alcohol, from the group consisting, for example, of propanediol, butanediol, pentanediol, hexanediol, heptanediol, octanediol, nonanediol, decanediol, undecanediol and dodecanediol, and other dihydroxyalkanes or -alkenes, when it is a matter of using a dihydric alcohol, and/or from the group consisting of glycerol, butanetriol, pentanetriol, hexanetriol, heptanetriol, octanetriol, nonanetriol, decanetriol, undecanetriol, dodecanetriol and other trihydroxyalkanes or -alkenes, when it is a matter of using a trihydric alcohol, or propane-1tri-2di-ol, when it is a matter of using an alcohol comprising five hydric functional groups.

The compositions according to the invention also comprise, in combination with the component (a), which is the paraffin wax, and optionally in combination with the other hydrocarbon compounds, such as the components (b) and/or (c), another component (d) formed of at least one latex which is composed of a colloidal aqueous emulsion of at least one polymer and/or copolymer chosen from the group consisting of homopolymers of acrylic acid, of methacrylic acid and of the esters of these acids, the ester group of which is a $C_1$ to $C_{12}$ alkyl group, such as methyl, ethyl, propyl, butyl, pentyl, hexyl, heptyl, octyl, 2-ethylhexyl, 2-ethylbutyl or 2-heptylhexyl, copolymers of acrylic acid, of methacrylic acid and/or of the esters of these acids, the ester group of which is a $C_i$ to $C_{12}$ alkyl group, copolymers of vinyl and of acrylic acid or of methacrylic acid, copolymers of vinyl and of ester groups of which are $C_1$ to $C_{12}$ alkyl groups, copolymers of acrylic or methacrylic acid, copolymers of acrylic acid or of methacrylic acid and of acrylic or methacrylic esters, styrene/acrylic or methacrylic copolymers, copolymers of ethylene and of vinyl acetate, copolymers of ethylene and of acrylic or methacrylic acid, acrylic/urethane copolymers and styrene/butadiene copolymers.

These various latexes comprise from 10% to 80% by weight of the polymer and/or copolymer employed in the context of the invention.

The compositions according to the invention also comprise, in combination with the component (a), which is the paraffin wax, and the component (d), which is the latex, and optionally in combination with at least one other hydrocarbon compound, such as the components (b) and/or (c), at least one pulverulent filler of inorganic or organic origin, the median particle size of which is between 1 μm and 100 μm and the distribution of which is between 0 μm and 300 μm.

The pulverulent inorganic filler is preferably chosen from the group consisting of calcium carbonate, clays and kaolin, alumina, microsilica, silica fume and barium sulfate, used alone or as a mixture.

This pulverulent inorganic filler has a BET specific surface of at least 1 m$^2$/g and preferably of between 20 m$^2$/g and 700 m$^2$/g, it being specified that the BET specific surface of this pulverulent inorganic filler increases in effectiveness as said specific surface increases.

The pulverulent organic filler is preferably chosen from the group consisting, for example, of the powders formed of polymers, copolymers, elastomers, thermoplastics or thermosets, employed alone or as a mixture. The pulverulent inorganic and organic fillers can be employed alone or as a mixture.

The compositions according to the invention, produced by means of the components (a), (b) and/or (c), (d) and (e), which are:
- paraffins of petroleum or synthetic origin including, as a mixture, saturated hydrocarbons of general formula $C_nH_{2n+2}$ and/or unsaturated hydrocarbons of general formula $C_nH_{2n}$ with n≦30;
- at least one other hydrocarbon compound which can be a linear and/or cyclic hydrocarbon oil of aliphatic and/or naphthenic origin which are hydrocarbon chains, alone or as a mixture, of general formulae $C_nH_{2n+2}$ and $C_nH_{2n}$ for which n is less than 30;
- optionally at least one other hydrocarbon compound chosen from the group of the hydrocarbon waxes and/or oils;
- at least one latex formed of a colloidal aqueous emulsion of at least one polymer and/or copolymer;
- and at least one pulverulent filler of inorganic or organic origin, are synergistic compositions intended to be applied to the surfaces of freshly placed or freshly demolded mortars and/or concretes in order to prevent the evaporation of the water necessary for their setting and for their hardening, the synergistic nature of which is attested to by their ability both to prevent the evaporation of water and to provide the treated surfaces with a much improved adhesion for the finishing materials.

This synergistic character is achieved once the various components of these compositions, as aqueous emulsions, are present, as percentages of active materials (or dry matter), in a proportion of:
- component (a) or paraffin wax: from 2% to 90% by weight, preferably from 5% to 60% by weight, very preferably from 5% to 40% by weight;
- component (b) or hydrocarbon compound: from 0% to 90% by weight, preferably from 8% to 40% by weight, very preferably from 9% to 30% by weight;
- component (c) or hydrocarbon compound other than the compound (b): from 0% to 90% by weight, preferably from 10% to 50% by weight, very preferably from 15% to 40% by weight;
- component (d) or latex formed of at least one polymer and/or copolymer as an emulsion in water: from 10% to 45% by weight and preferably from 15% to 35% by weight;
- component (e) or pulverulent inorganic and/or organic filler: from 0.01% by weight to 10% by weight and preferably from 0.02% by weight to 5% by weight;
- water: q.s. for 100% by weight.

Preferably, when the components (b) and/or (c) are chosen from hydrocarbon compounds which are liquid at ambient temperature:
- the component (b) is chosen from linear and/or cyclic hydrocarbon oils of aliphatic and/or naphthenic origin which are hydrocarbon chains, alone or as a mixture, of general formulae $C_nH_{2n+2}$ and $C_nH_{2n}$ for which n is less than 30;
- the component (c) is chosen from oils formed of at least one ester resulting from the condensation reaction of a saturated and/or unsaturated fatty acid with a mono-, di- or trihydric alcohol.

The compositions according to the invention, produced by means of the components (a), (b) and/or (c), (d) and (e), are in a synergistic state when the compositions are applied to the surfaces of freshly placed or freshly demolded mortars and/or concretes since they simultaneously prevent evaporation of the water, which is necessary for their setting and for their hardening, far better than the emulsions formed of paraffin waxes alone or of oils alone and provide said surfaces thus treated with a much improved adhesiveness of the finishing materials which have to cover them.

This synergistic character is achieved once the various components of these aqueous compositions or emulsions are present, as percentages of active materials (or dry matter), in a proportion of:
- component (a) or paraffin wax: from 2% to 90% by weight, preferably from 5% to 60% by weight, very preferably from 5% to 40% by weight;
- component (b) or hydrocarbon compound: from 5% to 90% by weight, preferably from 8% to 40% by weight, very preferably from 9% to 30% by weight;
- component (c) or oil formed of at least one ester: from 5% to 90% by weight, preferably from 10% to 50% by weight, very preferably from 15% to 40% by weight;
- component (d) or latex formed of at least one polymer and/or copolymer as an emulsion in water: from 10% to 45% by weight and preferably from 15% to 35% by weight;
- component (e) or pulverulent inorganic and/or organic filler: from 0.01% by weight to 10% by weight and preferably from 0.02% by weight to 5% by weight;
- water: q.s. for 100% by weight.

Furthermore, the ratio by weight, as dry active material, of the total of the components (b) and/or (c) and of the paraffin wax present in the aqueous emulsions of the compositions according to the invention must be at least equal to 0.25, may preferably be at least equal to 0.63 and very preferably may vary between 0.64 and 9.

The compositions according to the invention, in the form of aqueous emulsions, have a dry matter content which can vary, in general, from 10% to 60% by weight but preferably from 30% to 50% by weight.

Said compositions in the form of aqueous emulsions are used by spraying over the surfaces to be protected, the working load deposited per unit of surface area being between 50 g/m$^2$ and 150 g/m$^2$ in order to achieve a water retention at least equal to 90% by weight of the amount of water lost by the untreated control.

The compositions according to the invention, which are aqueous emulsions, are stable on storage, even prolonged storage.

Furthermore, when these compositions according to the invention are applied, they prove to have a very high effectiveness as, in contrast to the compositions of the state of the art, they require a far smaller amount of dry active material deposited per m² to be protected, thus rendering them both very effective and very economical.

The invention also relates to a process for the preparation of the compositions for protection against the evaporation of water from the surfaces of freshly placed or freshly demolded mortars and/or concretes which comprises the successive stages of introduction of the various components into a preparation region subjected to very vigorous stirring, the contents of which can be heated and/or cooled, these stages being:

i) the introduction into said region, according to the calculated amount, of the water necessary to create the emulsion and then optionally the introduction of an emulsifying agent, this first mixture being subjected to vigorous stirring during the time needed to produce a homogeneous medium;

ii) the introduction, according to the calculated amounts, of a mixture of the components (b) and/or (c), forming a second mixture, which is subjected to the same vigorous stirring during the time needed to produce the first emulsion;

iii) the introduction, according to the calculated amount and with gentle stirring, of the paraffin wax into the mixture resulting from ii):

heated beforehand to a temperature sufficient to cause the paraffin wax to melt and to convert the paraffin wax into the emulsion state, when said paraffin wax is introduced in the form of a very fine powder; or at ambient temperature, when the paraffin wax is introduced in the form of an aqueous emulsion;

and maintenance of gentle stirring during the prolonged time needed to form the emulsion, with optional cooling of the emulsion;

iv) the introduction into the mixture resulting from iii), according to the calculated amount and with gentle stirring, of the component (d), which is the latex, subjected to gentle stirring during the time needed to produce the aqueous emulsion formed of the components (a), (b), (c) and (d);

v) the introduction into the emulsion resulting from iv), according to the calculated amount and with vigorous stirring, of the component (e), which is the pulverulent inorganic and/or organic filler;

vi) and then subjection of the emulsion resulting from the second mixture converted to an aqueous emulsion resulting from v) to gentle stirring for a prolonged time in order to homogenize the aqueous emulsion formed comprising all the components.

This final gentle stirring time of stage iv) or vi) can reach 90 minutes, indeed even exceed it, in order to obtain an emulsion having a drop size of less than or equal to one micron.

The invention will be better understood by virtue of the various examples below, presented by way of illustration without implied limitation.

In the context of these examples, which illustrate the ability of the compositions according to the invention both to prevent the evaporation of the water from freshly placed or freshly demolded mortars and/or concretes and to provide the surfaces treated by said compositions with a much improved adhesiveness for the finishing materials covering them, the adhesion tests to which said compositions are subjected are defined below:

Manufacture of Concrete, One of the Surfaces of which is Treated by the Composition According to the Invention An admixture-comprising self-placing concrete with the following composition as % by weight:

| | |
|---|---|
| aggregate (reference) | 78.5% |
| hydraulic binder (reference) | 12.5% |
| admixture | 1.5% |
| water | 7.5% | is manufactured. The spreading, measured with an 1100 cm³ cone, is between 34 and 37 cm. The concrete thus produced is introduced into 40×40×8 cm molds and the surface of the concrete is floated to produce a smooth surface.

Concrete slabs with the same composition are thus prepared.

Deposition on the Smooth Concrete Surface of the Composition According to the Invention The treatment composition is sprayed at the rate of 100 to 200 g/m² over said free surface of a prepared concrete slab.

Another concrete slab, produced at the same time as the first, forms the reference surface, devoid of any surface treatment by the composition according to the invention.

Covering the Surfaces of the Concrete Slabs Treated by the Composition According to the Invention and Untreated Slabs Stoneware tiles are adhesively bonded to the surface of the slabs treated and not treated with the composition according to the invention, two weeks after the manufacture of said slabs.

The tiles are adhesively bonded to the surface of the slabs by means of a tiling adhesive mortar (Lanko 554 adhesive, sold by Lafarge Mortiers).

This adhesive mortar is applied according to the procedure which consists in using:

a trowel with 5×5×5 square teeth for spreading the adhesive mortar, a load of 2 kg deposited on the tiles during adhesive bonding, 10 tiles being adhesively bonded per slab, a drying time of the adhesive mortar which is 7 days.

Adhesive Bonding to the Ceramic Tiles of the T-Pieces Used for Tearing Off

The T-pieces used for tearing off are adhesively bonded using the Lanko 532 adhesive one day before tearing off the tiles.

Tearing Off the Tiles Via the T-Pieces

The tiles are torn off via the T-pieces using a tensile testing device

EXAMPLE 1

This example relates to curing compositions devoid of latexes and of inorganic fillers.

Compositions were prepared in the form of an aqueous emulsion, which compositions are formed of:
- paraffin wax: Redesmol 300 (registered trademark), sold by Repsol in the form of an aqueous emulsion with a solids content of 63%, and Mobilcer 115 and Mobilcer 730 (registered trademarks), sold by Mobil in the form of aqueous emulsions with solids contents of 45% and 50% by weight respectively;
- oil of type (b), which is a paraffinic oil with a low viscosity equal to 20 mm$^2$/s, sold by Exxon-Mobil under the trade name 60 Neutral;
- water: q.s. for 100% by weight.

The method of preparation was as follows:

Firstly, the amount of water necessary for the preparation of the composition according to the invention by the formation of an aqueous emulsion is introduced into an appropriate reactor.

When the paraffin wax is provided as an aqueous emulsion, the amount of water initially introduced takes into account the amount of water present in the aqueous paraffin wax emulsion.

If necessary, an emulsifying agent (surfactant) is introduced into the initial volume of water, for example Montanox 85 (registered trademark), sold by Seppic.

The water initially introduced is subjected, whether or not it comprises a dispersing agent, to powerful stirring by an Ultra-Turrax stirrer rotating at 20 000 revolutions/minute.

The oil of type (b) is introduced into the aqueous volume under this powerful stirring with the formation of a mixture maintained under powerful stirring for five minutes, in order to form the "oil-in-water" emulsion.

At the end of these five minutes of vigorous stirring, said stirring is reduced, the rotational speed of the Ultra-Turrax being brought to 5000 revolutions/minute. The aqueous paraffin wax emulsion is introduced into the oil-in-water emulsion under this gentle stirring.

When the introduction of the aqueous paraffin wax emulsion is complete, the mixture of emulsions formed is subjected, for at most 90 minutes, to gentle stirring, the rotational speed of the Ultra-Turrax being maintained at 5000 revolutions/minute.

At the end of this final stirring time, the composition is ready to be made use of by spraying, at the rate of 100 g/m$^2$, a composition comprising a solids content of 50% by weight.

Ten formulations with compositions Ai (with i=1 to 10) were prepared, the percentages by weight of the components of which are given in table I below.

TABLE I

| Formulation No. | % by weight of the total of the water in the emulsion | % by weight of paraffin wax solids content | % by weight of paraffinic oil of type (b) | % by weight of total solids content |
|---|---|---|---|---|
| A1 | 37.00 | 63.00 (1) | 0 | 63.00 |
| A2 | 55.00 | 45.00 (2) | 0 | 45.00 |
| A3 | 50.00 | 30.00 (2) | 20.00 | 50.00 |
| A4 | 50.00 | 25.00 (2) | 25.00 | 50.00 |
| A5 | 50.00 | 20.00 (2) | 30.00 | 50.00 |
| A6 | 50.00 | 15.00 (2) | 35.00 | 50.00 |
| A7 | 50.00 | 10.00 (2) | 40.00 | 50.00 |
| A8 | 50.00 | 50.00 (3) | 0 | 50.00 |
| A9 | 50.00 | 35.00 (3) | 15.00 | 50.00 |
| A10 | 50.00 | 30.00 (3) | 20.00 | 50.00 |

(1) Redesmol 300 paraffin wax
(2) Mobilcer 115 paraffin wax
(3) Mobilcer 730 paraffin wax In addition, each of these ten formulations comprised 1% by weight of an emulsifying agent (surfactant) which is Montanox 85.

In the abovementioned table I, the percentage by weight of water present in the composition according to the invention is the total of water present in the aqueous paraffin wax emulsion employed and of the water introduced as extra, the percentage by weight of paraffin wax being thus expressed as percentage by weight of solids content, as well as the percentage by weight of the paraffinic oil of type (b).

By way of comparison, the formulations A1, A2 and A8 of aqueous emulsion compositions were prepared, each comprising one type of paraffin wax employed alone or employed in the seven other formulations, in order to make possible experimental comparisons.

The formulations of each of these comparative compositions are given in table II below.

Tests on the use of said compositions were carried out in the form of a sprayed layer for each of them, deposited on the surface of freshly placed or freshly demolded concrete slabs, applied in order to provide both water retention within said concretes during the setting and then their hardening and adhesion of the ceramic tiles to said surfaces of the treated slabs (constituting the test slabs) and of the untreated slabs (constituting the control slabs).

These tests on protecting surfaces and on improving adhesivenesses were carried out at an equivalent dosage, this dosage being 100 g/m$^2$ of each emulsion A1 to A10.

The results of the improved adhesiveness and water retention have been combined in table II below in the form of a coefficient of protection at 6 hours and 24 hours after the pouring of the concrete, which indicates the percentage by weight of water maintained on the treated surfaces, and of a tension value in MPa, given by a tensile testing device at the moment when each ceramic tile is torn off.

TABLE II

| Formulation No. | Coefficient of protection for the treated surfaces | | Measurement of the adhesiveness at the treated and untreated surfaces Tension value in MPa | |
|---|---|---|---|---|
| | at 6 hours | at 24 hours | Treated surface | Untreated surface |
| (Control) A1 | 91.7 | 86.9 | 0.93 | 1.33 |
| (Control) A2 | 26.0 | 17.1 | 0.76 | 1.33 |
| A3 | 99.3 | 96.7 | 0.36 | 1.5 |
| A4 | 100 | 96.5 | 0.24 | 1.5 |
| A5 | 95.6 | 93.0 | 0.16 | 1.5 |
| A6 | 93.6 | 91.5 | 0.46 | 1.5 |
| A7 | 90.5 | 88.6 | 0.32 | 1.5 |

TABLE II-continued

| Formulation No. | Coefficient of protection for the treated surfaces | | Measurement of the adhesiveness at the treated and untreated surfaces Tension value in MPa | |
|---|---|---|---|---|
| | at 6 hours | at 24 hours | Treated surface | Untreated surface |
| (Control) A8 | 18.0 | 14.7 | 0 | 1.68 |
| A9 | 95.7 | 91.2 | 0 | 1.68 |
| A10 | 90.1 | 87.6 | 0 | 1.68 |

The comments which may be drawn from these two tables are as follows:
- there is clearly synergy as regards retention of water in the compositions as the comparison of the formulations A3 to A7 or A9 to A10, comprising the paraffin wax and the oil, and the formulations A1, A2 and A8, for the paraffin wax alone, shows that the simultaneous presence of the oil and of the paraffin wax in the aqueous emulsion composition leads to results as regards water retention which are much better than the results of the controls;
- a phenomenon of maximization of the protection of the treated surfaces occurs when the ratio of the percentages by weight of oil to the percentages by weight of paraffin wax solids content in the compositions is very preferably between 0.64 and 9;
- protection of the treated surfaces is achieved with a low amount of dry active material of the compositions with respect to the control compositions;
- the adhesivenesses of the formulations A3 to A7 comprising paraffin wax and oil are not very satisfactory;
- the formulations comprising the paraffin wax Mobilcer 730 are ineffective with regard to adhesiveness.

EXAMPLE 2

This example relates to curing compositions comprising latexes but devoid of inorganic fillers.

Compositions according to the invention were prepared in the form of an aqueous emulsion, which compositions are formed of:
- paraffin wax: Mobilcer 115 (registered trademark), sold by Mobil in the form of an aqueous emulsion with a solids content of 45% by weight;
- oil of type (b), which is a paraffinic oil with a low viscosity equal to 20 mm$^2$/s, sold by Mobil under the trade name 60 Neutral;
- latex: Primal AC261 K, sold by Röhm & Haas;
  - LS2, sold by Goodyear;
  - Mowiton M 360, sold by Hoechst;
  - Orgal PST 50, sold by Organik Kimya;
  - Plextol D498 or B500, sold by Carrechim;
  - Vinamul 3249, sold by Vinamul;
  - Dowlatex 465, sold by Lambert-Riviére,
which are acrylic, stryrene/acrylic, acrylic/methacrylate, vinyl acetate/ethylene or styrene/butadiene polymers or copolymers;
- water: q.s. for 100% by weight.

The method of preparation of the compositions is the same as that described in example 1, it being understood, however, that, after the completion of the introduction of the aqueous paraffin wax emulsion, the latex emulsion is introduced in its turn with gentle stirring. The mixture of emulsions formed is then subjected, for at most 90 minutes, to the same gentle stirring, the rotational speed of the Turax being maintained at 5000 revolutions/minute.

Fifteen formulations were prepared, the percentages by weight of the components of which are given in table III. These formulations Bj (j=1 to 15) result from certain formulations Ai (i=1 to 10) resulting from example 1, to which at least one latex has been added.

TABLE III

| Formulation Bj No. | % by weight of solids content of the formulation Ai employed | Total % by weight of water in the emulsion | % by weight of latex solids content | % by weight of total solids content |
|---|---|---|---|---|
| B1 | 30 of A4 | 50.00 | 20 Vinamul 3171 | 50.00 |
| B2 | 30 of A4 | 50.00 | 20 Dowlatex | 50.00 |
| B3 | 20 of A4 | 50.00 | 30 Dowlatex | 50.00 |
| B4 | 10 of A4 | 50.00 | 40 Dowlatex | 50.00 |
| B5 | 30 of A4 | 50.00 | 20 Primal AC 261 K | 50.00 |
| B6 | 30 of A4 | 50.00 | 20 Orgal PST 50 | 50.00 |
| B7 | 30 of A4 | 50.00 | 20 LS2 | 50.00 |
| B8 | 30 of A4 | 50.00 | 20 MM 360 | 50.00 |
| B9 | 30 of A4 | 50.00 | 20 PD498 | 50.00 |
| B10 | 25 of A4 | 50.00 | 25 MM 360 | 50.00 |
| B11 | 20 of A4 | 50.00 | 30 PD498 | 50.00 |
| B12 | 30 of A5 | 50.00 | 20 PD498 | 50.00 |
| B13 | 30 of A3 | 50.00 | 20 PD498 | 50.00 |
| B14 | 20 of A4 | 50.00 | 30 MM 360 | 50.00 |
| B15 | 25 of A4 | 50.00 | 25 PD498 | 50.00 |

Each formulation Bj is obtained by taking a percentage of a formulation Ai resulting from table I made up by the introduction of a latex.

Tests on the use of said compositions were carried out in the form of a sprayed layer for each of them, deposited on the surface of freshly placed or freshly demolded mortars and/or concretes, applied to provide improved adhesiveness and water retention of said surface mortars or concretes during the setting and then their hardening These tests were carried out at an equivalent dosage, this dosage being 150 g/m$^2$ of the emulsion with a solids content of 50%.

The results of this water retention and of the improved adhesiveness have been combined in table IV in the form of a coefficient of protection at 6 hours and 24 hours after the pouring of the concrete, which indicates the percentage by weight of water maintained on the treated surfaces, and a tension value in MPa for the measurement of the improved adhesiveness at the surfaces treated by said compositions and at the untreated surfaces constituting the controls.

TABLE IV

| Formulation Bj No. | Water retention of the treated surfaces Coefficient of protection | | Measurement of adhesiveness at the treated and untreated surfaces Tension value in MPa | |
|---|---|---|---|---|
| | at 6 hours | at 24 hours | Treated surface | Untreated surface |
| B1 | 99.6 | 95.8 | 0.71 | 1.51 |
| B2 | 99.7 | 95.9 | 0.82 | 1.51 |
| B3 | 98.2 | 94.7 | 1.21 | 1.51 |

TABLE IV-continued

| Formulation Bj No. | Water retention of the treated surfaces Coefficient of protection | | Measurement of adhesiveness at the treated and untreated surfaces Tension value in MPa | |
|---|---|---|---|---|
| | at 6 hours | at 24 hours | Treated surface | Untreated surface |
| B4  | 96.6 | 92.8 | 1.50 | 1.51 |
| B5  | 99.3 | 95.2 | 0.97 | 1.42 |
| B6  | 99.7 | 95.5 | 1.10 | 1.42 |
| B7  | 99.8 | 95.8 | 0.53 | 1.36 |
| B8  | 99.4 | 94.9 | 0.27 | 1.36 |
| B9  | 99.8 | 96.0 | 0.56 | 1.36 |
| B10 | 98.3 | 94.7 | 0.47 | 1.36 |
| B11 | 95.4 | 92.8 | 1.23 | 1.36 |
| B12 | 95.7 | 93.1 | 0.43 | 1.36 |
| B13 | 99.4 | 96.5 | 0.32 | 1.36 |
| B14 | 98.6 | 95.0 | 0.55 | 1.36 |
| B15 | 98.5 | 94.8 | 0.56 | 1.36 |

In the abovementioned table III:

the percentage by weight of water present in the composition is the total of the water present in the Mobilcer 115 emulsion (with a solids content of 45% by weight), the percentage by weight of paraffin wax thus being expressed as percentage by weight of solids content, and the paraffinic oil employed;

the compositions Bj have received 1% of an emulsifying agent which is a nonionic agent, sorbitan ester, having 85 ethylene oxide units, sold under the trade name Montanox 85 by Seppic.

The adhesivenesses of the compositions Bj (j=1 to 15) compared with the adhesivenesses of Ai from which the Bj formulations result, that is to say, the adhesivenesses of:

B1 to B11, B14 and B15 are to be compared with that of A4 (table II), which is 0.24, B12 is to be compared with that of A5 (table II), which is 0.16, B13 is to be compared with that of A3 (table II), which is 0.36.

These comparisons already show a significant increase in this adhesiveness.

The comparisons of the adhesivenesses of the compositions B2, B3 and B4 with one another, of the compositions B9, B11 and B15 with one another and of the compositions B8, B10 and B14 with one another also show that the increase in the latex content of said compositions results in an increase in the adhesiveness of said compositions.

EXAMPLE 3

This example relates to curing and improved adhesion compositions comprising latex and pulverulent inorganic filler.

Compositions Ck (k=1, 2 or 3) were prepared according to the invention, which compositions are formed of:

paraffin wax: Mobilcer 115 (registered trade name), sold by Mobil in the form of an aqueous emulsion with a solids content of 45% by weight;

oil of type (b), which is a paraffinic oil with a low viscosity equal to 20 mm²/s, sold by Mobil under the registered trade name 60 Neutral;

latex: copolymer of acrylic and methacrylic acids which is Plextol D498, sold by Carrechim;

pulverulent inorganic filler: calcium carbonate with a specific surface of 20 m²/g, microsilica with a specific surface of 450 m²/g or silica fume with a specific surface of 27 m²/g;

emulsifying agent (surfactant): 1% by weight of Montanox 85, sold by Seppic;

water: q.s. for 100% by weight.

The method of preparation of this composition is the same as that described in example 1, it being specified that, after the completion of the introduction of the aqueous paraffin wax emulsion:

the latex emulsion is introduced in its turn with gentle stirring;

then the mixture is subjected to powerful stirring by the Turax stirrer rotating at 20 000 revolutions/minute and, under this powerful stirring, the inorganic filler is introduced into the aqueous volume with the formation of a mixture, under this powerful stirring, over five minutes;

when the introduction of the inorganic filler is complete, the resulting mixture is subjected to gentle stirring via the Turax stirrer, the speed of which is brought from 20 000 revolutions/minute to 5000 revolutions/minute, which gentle speed is maintained for 90 minutes.

At the end of this final stirring time, the composition according to the invention is ready to be made use of by spraying, at the rate of 150 g/m², a composition with a solids content of approximately 50% by weight.

Three formulations were prepared, the percentages by weight of the components of which are given in this table V below.

TABLE V

| | Composition C1 as % by weight of solids content | Composition C2 as % by weight of solids content | Composition C3 as % by weight of solids content |
|---|---|---|---|
| % by weight of the total of the water in the emulsion | 48.95 | 48.95 | 48.95 |
| % by weight of emulsifying agent | 1 | 1 | 1 |
| % by weight of latex solids content | 20 | 20 | 20 |
| % by weight of inorganic filler | 0.05 of CaCO₃ (1) | 0.05 of pyrogenic silica (microsilica) (2) | 0.05 of silica fume (3) |

(1) with a mean diameter of 40 μm and a BET specific surface of 20 m²/g
(2) with a mean diameter of 50 μm and a BET specific surface of 450 m²/g
(3) with a mean diameter of 40 μm and a BET specific surface of 27 m²/g Tests on the use of said compositions were carried out in the form of a sprayed layer for each of them, deposited on the surface of freshly placed or freshly demolded concrete slabs, applied to provide both water retention within said concretes during the setting and then their hardening and adhesion of the ceramic tiles to said surfaces of the treated slabs (constituting the test slabs) and of the slabs treated with the same composition devoid of inorganic filler (constituting control slabs).

These tests on protecting surfaces and on improving adhesivenesses were carried out at an equivalent dosage, this dosage being 150 g/m² of the emulsion.

The results of the improved adhesiveness and water retention have been combined in table VI below in the form of a coefficient of protection at 6 hours and 24 hours after the pouring of the concrete, which indicates the percentage by weight of water maintained on the treated surfaces, and of a tension value in MPa, given by a tensile testing device at the moment when each ceramic tile is torn off.

TABLE VI

| Formulation No. | Coefficient of protection for the treated surfaces | | Measurement of the adhesiveness at the treated surfaces Tension value in MPa | |
|---|---|---|---|---|
| | at 6 hours | at 24 hours | Surface treated with filler-comprising composition Ck | Surface treated with composition Ck without inorganic filler |
| C1 | 99.4 | 95.0 | 0.67 | 0.53 |
| C2 | 99.8 | 95.8 | 0.98 | 0.53 |
| C3 | 99.0 | 94.7 | 0.62 | 0.53 |

Comparison of the adhesivenesses between the compositions C1, C2 and C3, comprising pulverulent inorganic fillers ($CaCO_3$, microsilica and silica fume), and the same compositions devoid of said pulverulent inorganic fillers (controls) shows that the inorganic filler in combination with a latex greatly increases the adhesiveness.

The silica-based inorganic filler results in a much greater adhesiveness than that of the calcium carbonate, at equal % by weight, being 0.05%, whether this adhesiveness increases as the specific surface of the inorganic filler increases.

EXAMPLE 4

This example relates to curing and improved adhesion compositions comprising various latexes and pulverulent inorganic fillers.

Compositions De (e=1 to 6) were prepared according to the invention, which compositions are formed of:
  paraffin wax: Mobilcer 115 (registered trade name), sold by Mobil in the form of an aqueous emulsion with a solids content of 45% by weight;
  oil of type (b), which is a paraffinic oil with a low viscosity equal to 20 $mm^2/s$, sold by Mobil under the registered trade name 60 Neutral;
  latex: copolymer of acrylic and methacrylic acids which is Plextol D498, sold by Carrechim;
  pulverulent inorganic filler: calcium carbonate with a specific surface of 20 $m^2/g$ or silica with a specific surface of 450 $m^2/g$;
  emulsifying agent (surfactant): 1% by weight of Montanox 85, sold by Seppic;
  water: q.s. for 100% by weight.

The method of preparation of this composition is the same as that described in example 3.

Formulations Dl (l=1 to 4) were prepared, the percentages by weight of the components of which are given in table VII below.

TABLE VII

| Dl | Formulation from which Dl results | Total % by weight of water | % by weight of latex solids content | % by weight of inorganic filler | % by weight of total solids content of the composition |
|---|---|---|---|---|---|
| D1 | B13 | 50.00 | 20 (PD498) | 0.07 $CaCO_3$ (1) | 50.00 |
| D2 | B7 | 50.00 | 20 (LS2) | 0.05 $CaCO_3$ (1) | 50.00 |
| D3 | B11 | 50.00 | 30 (PD498) | 1.36 Silica (2) | 50.00 |
| D4 | B15 | 50.00 | 25 (PD498) | 1.21 Silica (2) | 50.00 |

* formulation Dl resulting from the formulation Bj
(1) $CaCO_3$, with a specific surface of 20 $m^2/g$
(2) Sipernat 50, with a specific surface of 450 $m^2/g$ Tests on the use of said compositions were carried out in the form of a sprayed layer for each of them, deposited on the surface of freshly placed or freshly demolded concrete slabs, applied to provide both water retention within said concretes during the setting and then their hardening and adhesion of the ceramic tiles to said surfaces of the treated slabs (constituting the test slabs) and of the slabs treated with the same composition devoid of inorganic filler (constituting control slabs).

These tests on protecting surfaces and on improving adhesivenesses were carried out at an equivalent dosage, this dosage being 150 $g/m^2$ of the emulsion.

The results of the improved adhesiveness and water retention have been combined in table VIII below in the form of a coefficient of protection at 6 hours and 24 hours after the pouring of the concrete, which indicates the percentage by weight of water maintained on the treated surfaces, and of a tension value in MPa, given by a tensile testing device at the moment when each ceramic tile is torn off.

TABLE VIII

| Formulation Dl No. | Coefficient of protection for the treated surfaces | | Measurement of the adhesiveness at the treated and untreated surfaces Tension value in MPa | | |
|---|---|---|---|---|---|
| | at 6 hours | at 24 hours | Surface treated with filler-comprising composition Dl | Surface treated with composition Dl without inorganic filler | Untreated surface |
| D1 | | | 0.75 | 0.32 | 1.36 |
| D2 | | | 0.67 | 0.53 | 1.36 |
| D3 | | | 1.33 | 1.23 | 1.36 |
| D4 | | | 0.67 | 0.56 | 1.36 |

The following observations are extracted from this table:
  the simultaneous increase in latex and in pulverulent inorganic filler results in excellent adhesiveness of the compositions according to the invention, it being possible for this adhesiveness to reach that of concrete surfaces untreated by said compositions and this adhesiveness exceeding the adhesiveness of the compositions of the same origin but devoid of the pulverulent inorganic filler.

What is claimed is:

1. A composition intended to be applied to the surfaces of freshly placed or freshly demolded mortars and/or concretes, before the beginning of setting, in order to prevent the evaporation of the water necessary for their setting and for their hardening and to create, on said surfaces, high adhesiveness to finishing materials intended to cover surfaces, which composition is provided in the form of an aqueous emulsion comprising:
  a) at least one paraffin wax of petroleum or synthetic origin including, as a mixture, saturated and unsaturated aliphatic hydrocarbons of general formulae $C_nH_{2n+2}$ and $C_nH_{2n}$ for which n is at least equal to 30 and for which the melting point is between 40° C. and 75° C.;
  b) at least one hydrocarbon compound which is a linear or cyclic hydrocarbon oil of aliphatic or naphthenic origin formed of hydrocarbon chains, alone or as a mixture, of general formulae $C_nH_{2n+2}$ and $C_nH_{2n}$ for which n is less than 30;
  c) at least one ester-containing formed of at least one ester resulting from the condensation reaction of a saturated or unsaturated fatty acid with an alcohol having from one to five hydric functional groups;
  d) at least one latex which is formed of a colloidal aqueous emulsion of at least one polymer or copolymer chosen from the group consisting of homopolymers of acrylic acid, of methacrylic acid and of the esters of these acids, the ester group of which is a $C_1$ to $C_{12}$ alkyl group, copolymers of acrylic acid, of methacrylic acid or of the esters of these acids, the ester group of which is a $C_1$ to $C_{12}$ alkyl group, copolymers of vinyl and of acrylic acid or of methacrylic acid, copolymers of vinyl and of $C_1$ to $C_{12}$ esters, copolymers of acrylic acid or of methacrylic acid and acrylic or methacrylic esters, styrene/acrylic or methacrylic copolymers, copolymers of ethylene and of vinyl acetate, copolymers of ethylene and of acrylic or methacrylic acid, acrylic/urethane copolymers and styrene/butadiene copolymers; and
  e) at least one pulverulent filler of inorganic or organic origin.

2. The composition as claimed in claim 1, wherein the paraffin wax is selected from the group consisting of alkanes, alkenes, and mixtures thereof, which are saturated or unsaturated hydrocarbons of petroleum or synthetic origin of general formulae $C_nH_{2n+2}$ and $C_nH_{2n}$ in which n has a value of between $30 \leq n \leq 120$.

3. The composition as claimed in claim 2, wherein the paraffin wax has a melting point of between 50° C. and 70° C.

4. The composition as claimed in claim 3, wherein the paraffin wax has a density of between 0.85 and 0.95.

5. The composition of claim 4, wherein the paraffin wax has a density of between 0.88 and 0.92.

6. The composition as claimed in claim 4, wherein the at least one hydrocarbon compound which is a linear or cyclic hydrocarbon oil of aliphatic or naphthenic origin has general formulae $C_nH_{2n+2}$ or $C_nH_{2n}$ in which n is a value of between 10 and 25.

7. The composition as claimed in claim 6, wherein the at least one hydrocarbon compound which is a linear or cyclic hydrocarbon oil of aliphatic or naphthenic origin formed of hydrocarbon chains is selected from hydrocarbon oils having a kinematic viscosity of between 5 and 500 $mm^2/s$.

8. The composition as claimed in claim 7, wherein the at least one hydrocarbon compound which is a linear or cyclic hydrocarbon oil of aliphatic or naphthenic origin is selected from hydrocarbon oils having a density of between 0.83 and 0.97.

9. The composition as claimed in claim 8, wherein the at least one ester-containing oil is formed of at least one ester resulting from the condensation reaction of a saturated or unsaturated fatty acid selected from the group of the $C_8$ to $C_{24}$ fatty acids with a mono-, di- or trihydric alcohol.

10. The composition as claimed in claim 9, wherein the fatty acids are selected from the group consisting of caprylic, capric, lauric, myristic, palmitic, stearic, arachidic, behenic, lignoceric, palmitoleic, oleic, gadoleic, erucic, linoleic, linolenic and isolinolenic acids.

11. The composition as claimed in claim 10, wherein the alcohols having from one to three hydric functional groups are selected from the group consisting of $C_2$ to $C_{20}$ alkanols and alkenols.

12. The composition as claimed in claim 11, wherein the monohydric alcohol is selected from the group consisting of ethanol, propanol, butanol, pentanol, stearyl alcohol and oleyl alcohol; the dihydric alcohol is selected from the group consisting of propanediol, butanediol, pentanediol, hexanediol, heptanediol, octanediol, nonanediol, decanediol, undecanediol and dodecanediol and other dihydroxyalkanes or -alkenes; and the trihydric alcohol is selected from the group consisting of glycerol, butanetriol, pentanetriol, hexanetriol, heptanetriol, octanetriol, nonanetriol, decanetriol, undecanetriol, and dodecanetriol.

13. The composition as claimed in claim 12, wherein the pulverulent inorganic filler is selected from the group consisting of calcium carbonate, clays and kaolin, alumina, micro silica, silica fume and barium sulfate, used alone or as a mixture.

14. The composition as claimed in claim 13, wherein the pulverulent inorganic filler has a median particle size of between 1 and 100 μm and a distribution of between 0 μm and 300 μm.

15. The composition as claimed in claim 14, wherein the pulverulent inorganic filler has a BET specific surface of at least 1 $m^2/g$.

16. The composition of claim 15, wherein the pulverulent inorganic filler has a BET specific surface of between 20 $m^2/g$ and 700 $m^2/g$.

17. The composition as claimed in claim 13, wherein the pulverulent organic filler is selected from the group consisting of powders formed of polymers, copolymers, elastomers, thermoplastics and thermosets.

18. The composition as claimed in claim 15, wherein:
  the at least one paraffin wax is present in said composition in a proportion of 2% to 90% by weight;
  the at least one hydrocarbon compound which is a linear or cyclic hydrocarbon oil of aliphatic or naphthenic origin which is a liquid at ambient temperature is present in said composition in a proportion of greater than 0% to 90% by weight;
  the at least one ester-containing oil formed of at least one ester resulting from the condensation reaction of a fatty acid with an alcohol is present in said composition in a proportion of greater than 0% to 90% by weight;
  the at least one latex formed of a colloidal aqueous emulsion of at least one polymer or copolymer is present in said composition in a proportion of 10% to 45% by weight of solids content;
  the at least one pulverulent filler of inorganic or organic origin, is present in said composition in a proportion of 0.01% by weight to 10% by weight;
  and water in a quantity sufficient for 100% by weight.

19. The composition as claimed in claim 15, wherein the composition comprises:
  2% to 90% by weight of at least one paraffin wax of petroleum or synthetic origin in the solid state including, as a mixture, saturated and unsaturated aliphatic hydrocarbons of general formulae $C_nH_{2n+2}$ and $C_nH_{2n}$ for which n is at least equal to 30 and for which the melting point is between 40° C. and 75° C.;

5% to 90% by weight of at least one hydrocarbon compound which is a linear or cyclic hydrocarbon oil of aliphatic or naphthenic origin which is a liquid at ambient temperature, alone or as a mixture, of general formulae $C_nH_{2n+2}$ and $C_nH_{2n}$ for which n is less than 30;

5% to 90% by weight of at least one ester-containing oil formed of at least one ester resulting from the condensation reaction of a saturated or unsaturated fatty acid with a mono-, di- or trihydric alcohol;

10% to 45% by weight of solids content of at least one latex formed of a colloidal aqueous emulsion of at least one polymer;

0.01% by weight to 10% by weight of at least one pulverulent inorganic filler with a BET specific surface at least equal to 1 $m^2/g$;

and water in a quantity sufficient for 100% by weight.

* * * * *